United States Patent [19]

Hassler et al.

[11] Patent Number: 4,773,041
[45] Date of Patent: Sep. 20, 1988

[54] SYSTEM FOR EXECUTING A SEQUENCE OF OPERATION CODES WITH SOME CODES BEING EXECUTED OUT OF ORDER IN A PIPELINE PARALLEL PROCESSOR

[75] Inventors: Joseph A. Hassler, West Chester; William G. Burroughs, Exton, both of Pa.

[73] Assignee: Unisys Corporation, Blue Bell, Pa.

[21] Appl. No.: 869,349

[22] Filed: Jun. 2, 1986

[51] Int. Cl.⁴ .............................................. G06F 9/00
[52] U.S. Cl. .................................................. 364/900
[58] Field of Search .............................. 364/200, 900

[56] References Cited

U.S. PATENT DOCUMENTS

| | | |
|---|---|---|
| 3,771,138 | 11/1973 | Celtruda et al. ............... 364/200 |
| 4,390,946 | 6/1983 | Lane ............................... 364/200 |
| 4,459,666 | 7/1984 | Kruger ............................ 364/200 |
| 4,561,052 | 12/1985 | Tateno ............................ 364/200 |
| 4,594,655 | 6/1986 | Hao et al. ...................... 364/200 |
| 4,638,429 | 1/1987 | Watabe et al. ................. 364/200 |

Primary Examiner—Gareth D. Shaw
Assistant Examiner—John Gladstone Mills
Attorney, Agent, or Firm—Mervyn L. Young; Kevin R. Peterson

[57] ABSTRACT

A referencing unit which creates addresses for main memory. Specifically, this reference unit is pipelined in the manner in which it receives the operators to be executed. Concurrency is achieved by allowing any number of read-type operations to be started before operators that are waiting for a store operation to finish even though these latter operators may appear earlier in the code stream. There are two inputs into the reference unit. Each is provided with a queue, one for receiving operators and address couples and another for receiving the output from the top-of-the-stack mechanism residing in the processor. The former is called an address coupled queue and the latter is called a top-of-stack queue. Since the address couple queue operators require no stack inputs, they enter the reference pipeline, two pipeline levels below where the top-of-stack operators enter the pipeline. This out-of-order execution allows the pipeline to remain full (with address couple queue operators) even though the top-of-stack operator is waiting for an input to become available.

4 Claims, 6 Drawing Sheets

| job arrival time | "job" | EAQ | OAQ | TQ |
|---|---|---|---|---|
| 1 | a | valc k | | |
| 2 | b | namc k/ store | | |
| 3 | c | valc m | | |
| 4 | d | | namc c/indx | indx |
| 5 | e | | | load |
| 6 | f | | namc c/nxlv | nxlv |
| 7 | g | | | store |
| 8 | h | valc z | | |
| 9 | i | wait_ store | | |
| 10 | j | valc k/ | | |
| 11 | k | namc k/ store | | |
| 12 | l | valc m | | |
| 13 | m | | namc c/indx | indx |
| 14 | n | | | load |
| 15 | o | valc z | namc c/nxlv | |
| 16 | p | wait_ store | | store |

SYSTEM FOR EXECUTING A SEQUENCE OF OPERATION CODES WITH SOME CODES BEING EXECUTED OUT OF ORDER IN A PIPELINE PARALLEL PROCESSOR

BACKGROUND OF THE INVENTION

1. Field of Invention

This invention relates to a system for executing operation code in an order different from that in which it is received and more particularly in such a system in a pipeline parallel processor.

2. Description of the Prior Art

Prior art data processors have in general been sequential in nature due to the sequential nature of the conventional imperative code they employ. A particulary processor module of this type is disclosed in the Barton, et al. U.S. Pat. Nos. 3,461,434; 3,546,677 and 3,548,384. These patents are directed toward a stack oriented data processor where the function of the stack mechanism, a first-in last-out mechanism, is to handle the flow of operators and associate parameters in a manner which reflects the nested structure of particular higher level languages. However, where it is desired to provide a customer with an upgrade for such a processor, it becomes necessary to increase the throughput of the processor while maintaining program compatability with previous and smaller members of the same processing family.

The execution of a sequence of code involves three basic forms of processing: the processing of the instruction format, the processing of references created by that instruction and the execution of the function specified by the instruction. In a simple sequential machine, the total time to execute a sequence So; ... Sn is $(I_0 + R_0 + R_0) + ... (I_n + R_n + E_n)$ where I is an instruction processing, R is a referencing processing and E is an execution processing. In a simpler pipeline machine, ignoring certain dependencies, the same sequence can be executed in a time equal to the largest sum of processing stage, namely $(I_0 + I_i + ... I_n)$ and so forth where the individual instruction processing, reference processing and execution processing are done in parallel. Such a parallel pipeline processor (as distinct from a parallel processing array) is disclosed in the Reynard et al. patent application U.S. Ser. No. 625,612, filed June 28, 1984, and assigned to the same assignee as the present invention.

The above described Reynard et al. application is directed towards a specific invention that is not directly related to the present application. However, in prior art parallel processors of the type described in that application, the incoming code stream is received by a program control unit which then generates operation codes, addresses and other parameters for transmission to an execution unit and a memory referencing unit for concurrent execution. These units receive their designated operators and so forth in respective queues for evaluation or execution in a pipeline manner. Such a pipeline is normally sequential in nature, particularly in the memory referencing unit, and greater concurrency can be achieved by executing a class of reference operations out of order with respect to the code stream, subject to certain limitations.

It is then an object of the present invention to provide an improved pipeline processor having increased concurrency of operation execution.

It is another object of the present invention to provide an improved parallel pipeline processor having concurrence in the reference pipeline of the memory address formation unit of the processor.

It is still another object of the present invention to provide improved concurrency in a pipeline processor by executing a class of reference operations out of order with respect to the incoming code stream.

SUMMARY OF THE INVENTION

In order to achieve the above identified objects, the present invention resides in a parallel processor and more particularly in the referencing unit of that processor which, among other things, creates addresses for main memory. Specifically, this reference unit is pipelined in the manner in which it receives the operators to be executed. Concurrency is achieved by allowing the number of read-type operators which are not affected by unfinished store operations to be started before operators that are waiting for a store operation to finish even though these latter operators may appear earlier in the code stream. There are two inputs into the reference unit. Each is provided with a queue, one for receiving operators and address couples and another for receiving the output from the top-of-the-stack mechanism residing in the processor. The former is called an address couple queue and the latter is called a top-of-stack queue. Since the address couple queue operators require no stack inputs, they enter the reference pipeline, two pipeline levels below where the top-of-stack operators enter the pipeline. This out-of-order execution allows the pipeline to remain full (with address couple queue operators) even though the top-of-stack operator is waiting for an input to become available.

A feature then of the present invention resides in a processor having a pipeline mechanism which allows any number of read-type operators to be started, which operators are not affected by unfinished store operetions, and such operations are started before operators that are waiting for a store operation to finish even though the latter type operators appear earlier in the code stream.

BRIEF DESCRIPTION OF THE DRAWINGS

The above and other objects, advantages and features of the present invention will become more readily apparent from a review of the following specification when taken in conjunction with the drawings wherein.

GENERAL DESCRIPTION OF THE INVENTION

Figure 1:
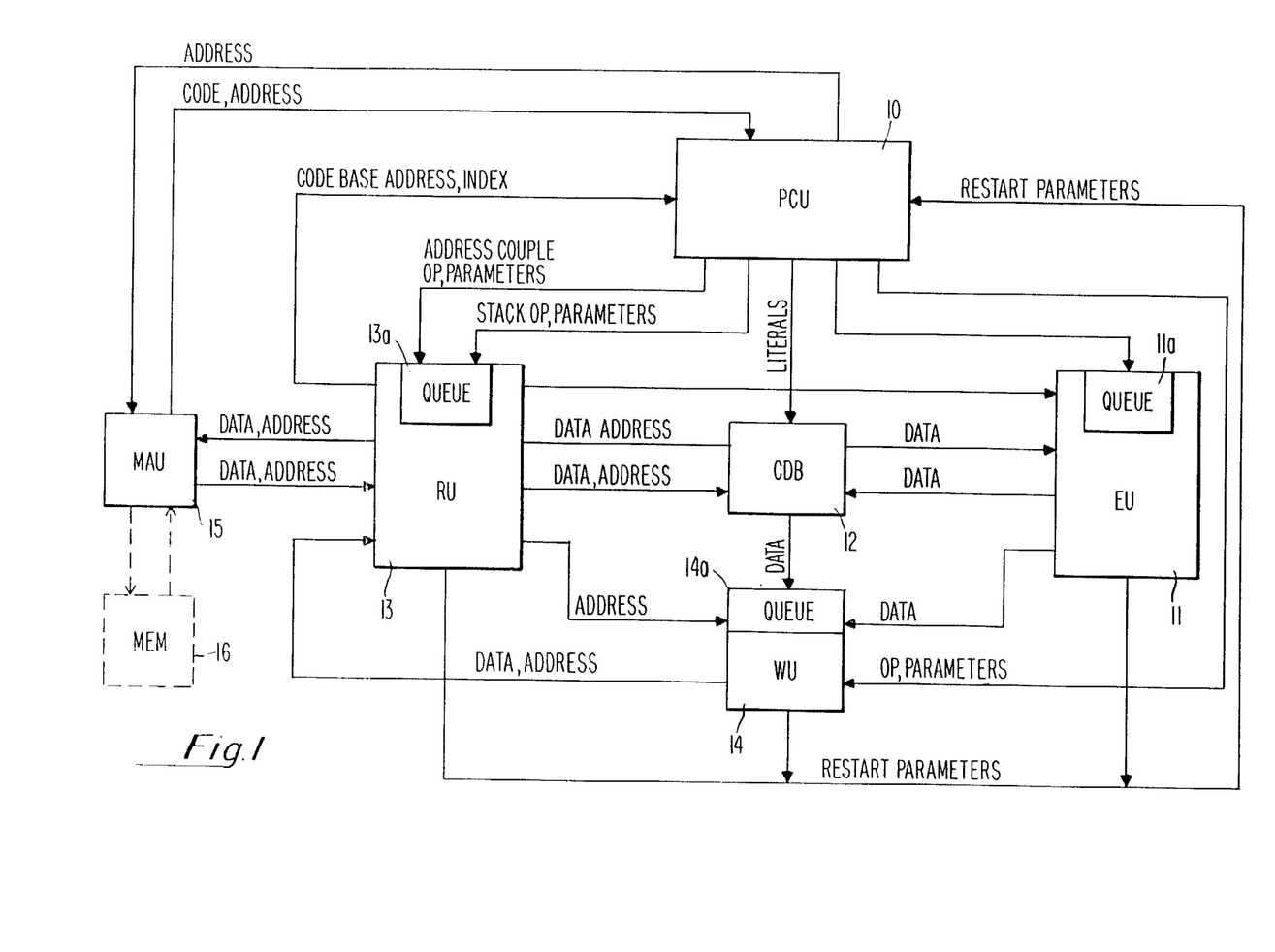
FIG. 1 is a schematic diagram of a pipeline parallel processor employing the present invention.

A general purpose processor employing the present invention is illustrated in FIG. 1. This processor includes a program scanner or program control unit 10 which receives a stream of code from memory 16 by way of memory addressing unit 15 and supplies operators and parameters to execution 11, reference unit 13 and write unit 14 and also data and literal values to central data buffer 12 which in turn can be accessed by both execution unit 11 and reference unit 13.

As illustrated in FIG. 1, execution unit 11 receives operators and parameters by way of execution unit queue 11a for subsequent execution in the order in which they are received. Simarily, reference unit 13 is also provided with reference unit queue 13a to receive address couples, operators and parameters in a manner that will be more thoroughly described below. It is the function of the program scanner 10 to supply these operators and parameters to the various units in parallel and to keep each unit's respective queue filled so that those units can be operating concurrently.

Before describing the present invention, a brief description will be given of stack-oriented processors and block-structured programming languages for which the processor in FIG. 1 has been designed. Such block-structured programming languages more readily represent complex algorithm and such block structuring of algorithms, i.e., nested declarations, is a natural form for the expression of such complex algorithms. A particular computer system that was designated to employ such lock-structured or nested languages, and also nested data structures, is described in Barton et al, U.S. Pat. Nos. 3,461,434; 3,546,677 and 3,548,384. These patents describe a stack-oriented data processor where the stack mechanism, a first-in last-out mechanism, handles the flow of operators and associated parameters in a manner which reflects the nested structure of particular higher level languages that are designed to handle natural forms for the expression of complex algorithms. While the invention ot the present application is not directed specifically to such stack-oriented processors, reference to stacks will be made in the following description, although it is not intended that the present invention be limited to such an environment.

Such a stack system is oriented around the concept of a segmented memory and specifically treated segments called stacks. The processor runs in an expression stack; operators take their arguments from the top of the stack and leave their results on the top of the stack. The data addressing space of the executing program is mapped into the stack as well as other stacks linked to it and data segments referenced by descriptors contained in the stack structure. In FIG. 1, there are four registers which serve as top-of-stack registers with remaining portions ot the stacks being stored in memory 16. These four registers are in central data buffer 12 in FIG. 1.

Figure 2:
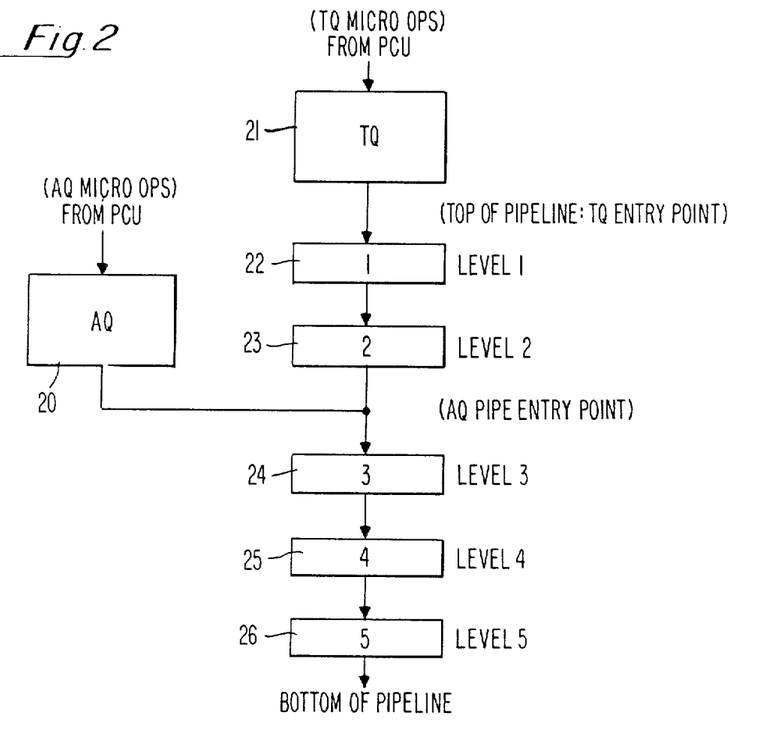
FIG. 2 is a diagram illustrating a pipelined nature of the reference unit of FIG. 1.
Figure 4:
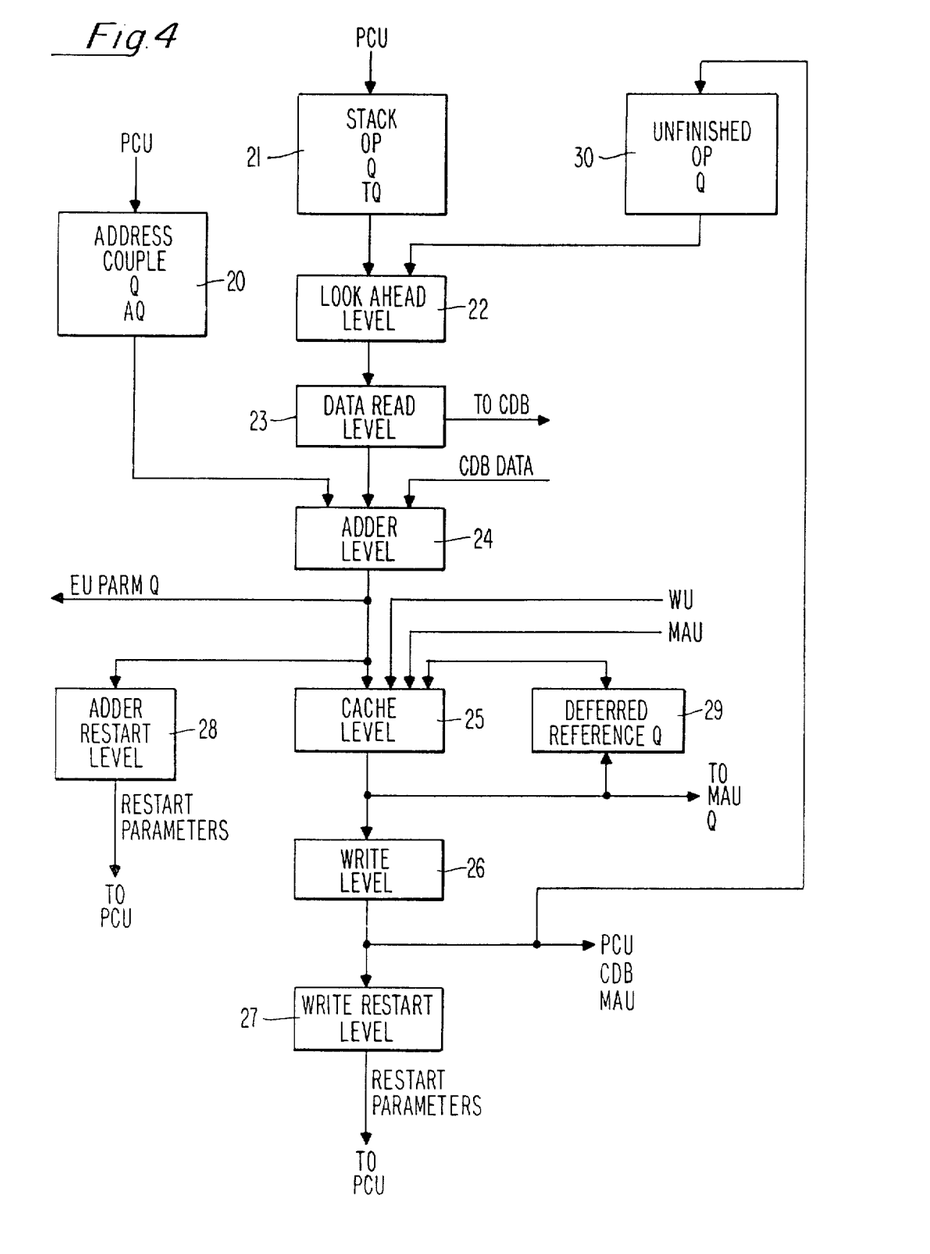
FIG. 4 is a more detailed schematic of the reference unit of FIGS. 1 and 2.

The normal entry to the pipeline is from top-of-stack queue 21 where the first level 22 of the pipeline performs an operator look-ahead function; the second level 23, such as data from central data buffer 12 of FIG. 1, as will be more thoroughly described in relation to FIG. 4; the third level 24 of the pipeline is an adder or evaluate level which among other things forms memory addresses from the address couples, the fourth level 25 as a cache level or output of the reference unit to either memory address unit 15 of FIG. 1 or central data buffer 12 of FIG. 1.

It is to be noted in FIG. 2 that the output from address couple queue 20 enters the pipeline at the beginning of third level 24 or the evaluate level since the operators in the address couple queue do not require inputs from the top of stack registers in central data buffer 12 of FIG. 1.

Figure 3A:
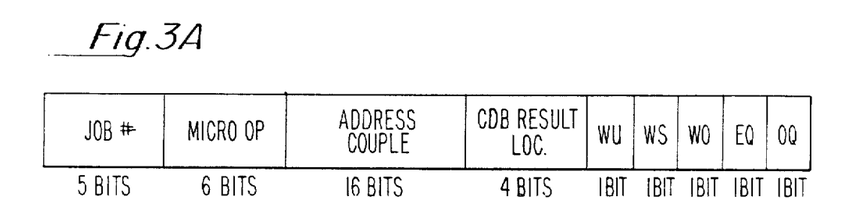
FIGS. 3A and B are formats respectively of the address operators stored in the address couple queue of FIG. 2 and top-of-stack operators stored in the top-of-stack queue of FIG. 2.

The formats of the respective information segments are control words stored in address couple queue 20 and top-of-stack queue 21 are illustrated respectively in FIGS. 3A and B. The address couple queue control word of FIG. 3A includes a five bit job number which indicates the relative micro operator issue time, a six bit micro operator specifying the operation to be performed by the reference unit, a sixteen bit address couple including a four bit base address register number (display register) plus a twelve bit offset from that base level from which the memory address may be calculated, a four bit central data butfer result location where the results of the memory fetch are to be placed, a one bit wait unconditional bit which will be more fully described below, a one bit wait store bit which will be more thoroughly described below and a one bit wait oldest control word which will be more thoroughly described below. It is to be noted again from FIG. 1 that these control words are received from program control unit 10 and do not require any inputs from top-of-stack registers in central data buffer 12 since all inputs to address couple queue 20 of FIG. 2 do not require stack inputs but are inputs from the code stream received by program control unit 10 of FIG. 1.

Figure 3B:
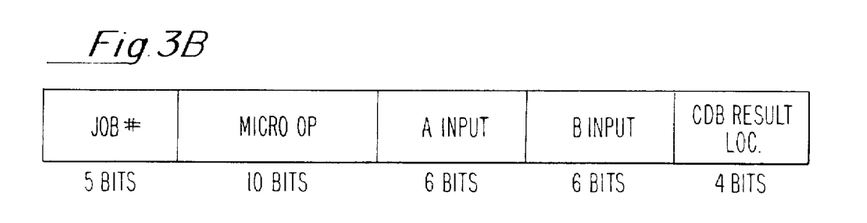

The top-of-stack control word is illustrated in FIG. 3B. It includes a five bit job number field, a ten bit micro operation field to specify the dperation to be performed by the reference unit, a six bit input address to address the first register in the top-of-stack registers of central data buffer 12 of FIG. 1, a six bit reference to specify the second top-of-stack register contents in central data buffer 12 of FIG. 1 and a four bit central data buffer result location which specifies the location in central data buffer 12 of FIG. 1 where the results of the reference unit operation are to be stored.

As illustrated in FIG. 1, program control unit 10 supplies two sets of data to queue mechanism 13a, namely address couple operators and parameters and stack operators and parameters. Therefore, queue mechanism 13a is really two separate mechanisms and this is illustrated in FIG. 2 which is a generalized diagram of the pipeline nature of reference unit 13 of FIG. 1. These two queues are address couple queue 20 (AQ) and top-of-stack queue 21 (TO). The normal entry to the pipeline is from top-of-stack queue 21 where the first level 22 of the pipeline performs an operator look-ahead function, the second level 23 fetches data from central data buffer 12 of FIG. 1 as will be more thoroughly described in relation to FIG. 4, the third level 24 of the pipeline is an adder or evaluate level which among other things forms memory addresses from the address couples, the fourth level 25 is a cache level or output buffer and the fifth level 26 is employed to transmit the output of the reference unit to either memory address unt 15 of FIG. 1 or central data buffer 12 of FIG. 1.

It is to be noted in FIG. 2 that the output from address couple queue 20 enters the pipeline at the beginning of third level 24 or the evaluate level since the operators in the address queue do not require inputs from the top-of-stack registers in central data buffer 12 of FIG. 1.

The formats of the respective information segments are control words stored in address couple queue 20 and top-of-stack queue 21 as illustrated respectively in FIGS. 3A and B. The address couple queue control word of FIG. 3A includes a five bit job number indicating the job, task or program being run, a six bit micro operator specifying the operation to be performed by the reference unit, a sixteen bit address couple including a four bit base address of a particular stack plus a twelve bit offset from that base level from which the memory address may be calculated, a four bit central data buffer result location where the results of a memory fetch are to be located, a one bit wait unconditional bit which will be more fully described below, a one bit wait store bit which will be more thoroughly described below and a one bit wait oldest control word which will be more thoroughly described below. It is to be noted again from FIG. 1 that the address couple queue control words are received from program control unit 10 and do not require any inputs from the top-of-stack registers in central data buffer 12, that is to say, no inputs to address couple queue 20 of FIG. 2 require stack inputs but are inputs from the code stream received by program control unit 10 of FIG. 1.

The top-of-stack control word is illustrated in FIG. 3B. It includes a five bit job number field, a ten bit micro operation field to specify the operation to be performed by the reference unit, a six bit input address to address the first register in the top-of-stack registers of central data buffer 12 of FIG. 1, a six bit reference to specify the second top-of-stack register in central data buffer 12 in FIG. 1 and a four bit central data buffer result location which specifies the location in central data buffer 12 of FIG. 1 where the results of the reference unit operation are to be stored.

In the system in which the present invention is embodied, there are two classes of operators employed which modify the content of memory cells: operators which only modify data words and operators which modify data and control words. Top-of-stack queue write operators must prevent newer address couple queue operators from referencing a memory cell about to be modified before the top-of-stack queue operator has actually changed it. The present invention is directed towards address couple queue 20 of FIG. 2 which is implemented as two "logical" queues: even and odd. Operators in the even address couple queue are micro operators which reference data words and operators in the odd address couple queue reference control words. The even/odd distinction is made by program control unit 10 of FIG. 1 at the time the operators are issued to the respective queues.

It is this partitioning of the address couple queue operators into two classes that allows the out-of-order execution of the address couple queue operators. That is, a newer odd address couple queue job could be allowed to enter the reference pipeline ahead of an older even address couple queue job. This is possible because of split address couple queue control logic which can select either the next odd address couple queue operator or the next even address couple queue operator to enter the pipeline. Allowing odd address couple queue operators to be selected out-of-order allows those operators to enter the pipeline ahead of older top-of-stack store operators since store type operators do not modify control words. Even address couple queue operators, however, must wait until an older top of stack queue store operator is past the queue pipeline entry point as illustrated in FIG. 2. This out-of-order execution increases performance because useful work can be done even though the top-of-stack queue operator is in a holding mode and "pipeline lag" is avoided by keeping the pipeline full which lag is associated with refilling the pipeline.

DETAILED DESCRIPTION OF THE INVENTION

FIG. 4 is a schematic diagram of reference unit 13 of FIG. 1 and is the circuitry which embodies the pipeline architecture logically illustrated in FIG. 2. As shown therein, address couple queue 20 and top-of-stack queue 21 receive respectively address couple operators and parameters and stack operators and parameters. Look-ahead level 22 is the beginning of the reference unit pipeline and determines the type of the top-of-stack operator being received and in turn notifies the remaining levels of the pipeline what type of operator is passing down the pipeline. The top-of-stack queue format then passes to data read level which address the required registers in central data buffer 12 of FIG. 1 which registers serve as top-of-stack registers. The contents of the addressed registers are received by adder level 24 which also receives the top-of-stack control word.

As was explained above in relation to FIG. 2, adder level 24 is the third logical level and is where address couple operators are received from address couple queue 20 which does not require any input from the top-of-stack. Adder level 24 performs whatever calculation such as addition is called for by the corresponding operator such as memory address formation and so forth. The output of adder level 24 is passed onto cache level 25 which is an output buffer and, in case of a parity error or other error detection, goes to adder restart level 28 to signal program control unit 10 of FIG. 1 to restart the sequence of operators currently being passed through the pipeline of the reference unit.

The output of cache level 25 can be sent to memory address unit 15 of FIG. 1 or to write level 26 from which it can be sent to program control unit 10, central data buffer 12 or memory address unit 15 of FIG. 1. In the case of an error at the write level 26, write restart level 27 signals program control unit 10 of FIG. 1 to restart the sequence.

In the case where the output of cache level 25 is to be sent to memory address unit 15 of FIG. 1 but the store operation cannot be achieved because main memory is not accessible, the address is sent to deferred reference queue to be passed again through cache level 25. Also some operators destined for program control unit 10, central data buffer 12 or memory address unit 15 may be of a nature which requires the repetition such as operators that call for a chaining of memory fetches until a target data is found such as might be employed in a virtual memory system. Such operators are sent to unfinished operator queue 30 to reenter the pipeline.

Although not shown in FIG. 4, each level of the pipeline is provided with its own control store which decodes or interprets the respective operators as they pass through the pipeline of FIG. 4.

Figure 5:
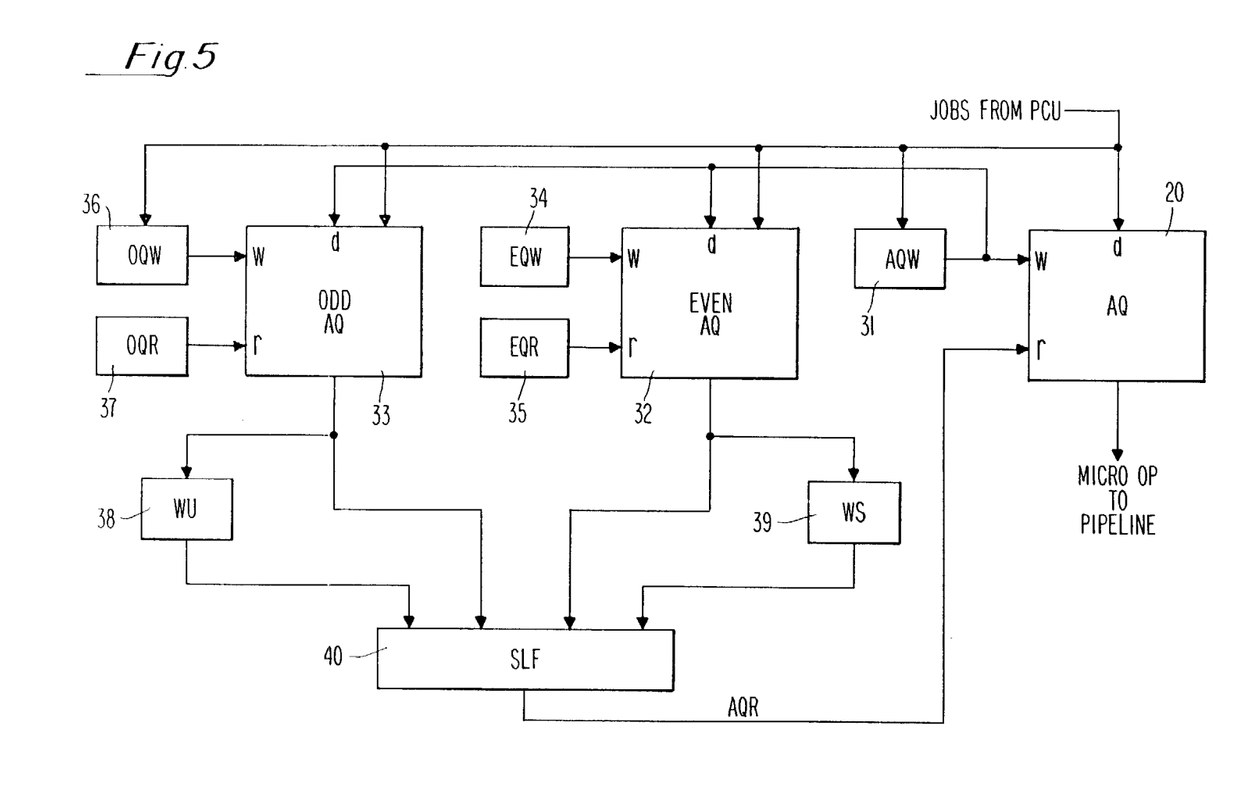
FIG. 5 is a more detailed schematic diagram of the address couple queue of FIGS. 2 and 4.

As has been indicated above, the implementation of the present invention is achieved through the use of a logically split address couple queue 20 of FIGS. 2 and 4 and the manner in which this address couple queue is logically split is illustrated in FIG. 5. As shown therein, address couple queue 20 still exists as a queue for receiving all address couple control words. However, additional logic is provided to address different types of control words depending upon whether they reference data or they reference other control words. The circuitry of FIG. 5 is implemented to take advantage of the fact that program control unit 10 of FIG. 1 has the ability to determine the type of word an operator will reference based solely on the code stream, as is more thoroughly described in the above referred to Reynard et al. application.

In the present invention, all address couple operators are defined as being either even operators, if they reference data, or odd operators, if they reference other control words. Referring back to FIG. 3A, the program control unit 10 sets either even queue bit EQ or odd queue bit OQ depending upon the type of operator that is detected by the program control unit.

Returning to FIG. 5, an incoming address couple control word increments address couple queue write counter 31 to address a new storage location in address couple queue 20 and the contents of address couple queue write pointer 31 is transmitted either to even address couple queue address memory 32 or odd address couple queue address memory 33 depending upon whether the even queue bit EQ or the odd address couple queue bit OQ has been set in the incoming control word. Depending upon which bit has been set, either the even queue write counter 34 or the odd queue write counter 36 is incremented to address its corresponding memory so that the actual address from address couple queue counter 31 can be stored in the corresponding memory 32 or 33. Stored along with that address is either wait unconditional bit WU or wait store bit WS depending upon whether the output of address couple queue counter 31 is being stored in memory 33 or memory 32 respectively.

Even queue read counter 35 and odd queue read counter 37 are clock driven to read out the respective addresses in even memory 32 and odd memory 33 along with their corresponding WS and WU bits. These addresses along with corresponding WS bit and WU bit are sent to stored logic function unit 40 which is basically a dynamic RAM memory that contains the appropriate stored logic to achieve the desired result depending upon the inputs to stored logic function unit 40. When the appropriate conditions exist, stored logic function unit 40 outputs an address to address couple queue 20 to read out the appropriate address couple control word to be sent to enter the reference unit pipeline of FIGS. 2 and 4 at the third level of that pipeline.

Referring back to FIG. 3A, the wait unconditional bit WU indicates that address couple queue 20 is to be "locked" until a synchronizing overwrite type top-of-stack queue job has passed the address couple queue pipeline entry point in FIGS. 2 and 4. A wait store bit WS indicates only micro operators addressed by the odd queue 33 may be read out of the address couple queue 20 until a synchronizing store type top-of-stack queue job has passed the address couple queue pipeline entry point. A wait oldest bit WO indicates that the oldest job in the address couple queue is to be selected, which enforces order in the execution of the address couple queue jobs and is rarely used.

If a top-of-stack queue store type operator is waiting for an input, stored logic function unit 40 of FIG. 5 will select the next location in address couple queue 20 to be that which is pointed to by the output of odd address couple queue memory 33. If a top-of-stack queue overwrite type operator is waiting for an input, stored logic function 40 of FIG. 5 will lock up address couple queue 20. Since such overwriting operators occur infrequently, locking up the address couple queue should have little overall performance impact. If there is no top-of-stack queue write operator holding in the pipeline in FIGS. 2 and 4, stored logic function 40 will select the oldest operator in address couple queue 20 for execution.

Figure 6A:
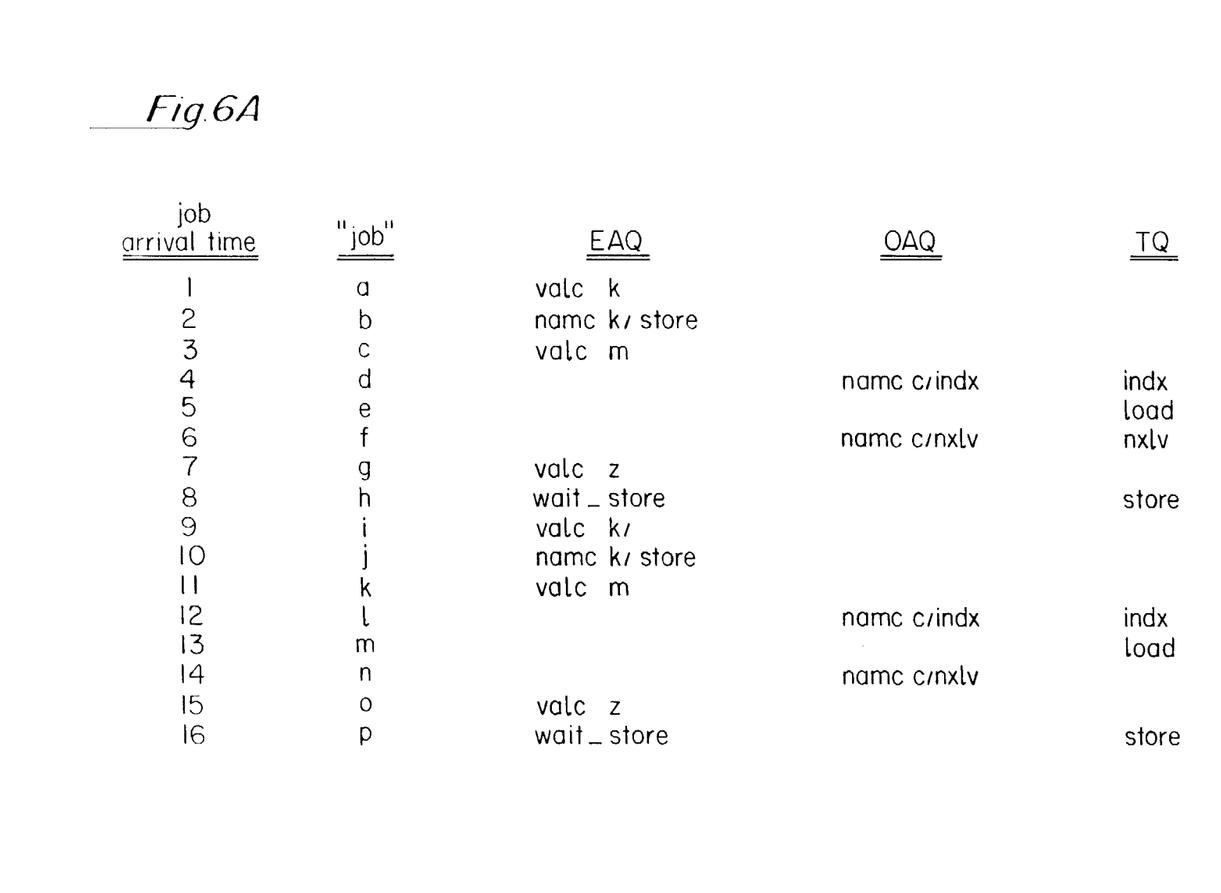
FIGS. 6A, B and C are tables illustrating the present invention.
Figure 6B:
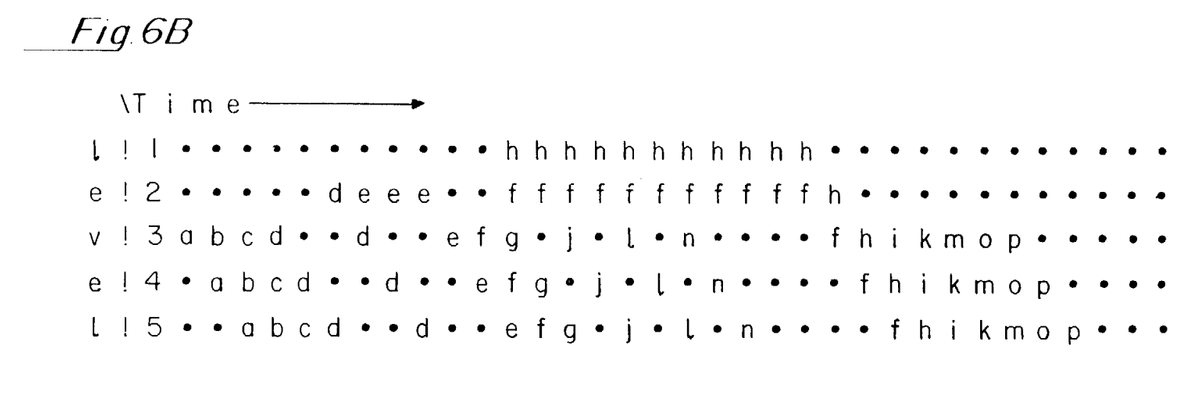
Figure 6C:
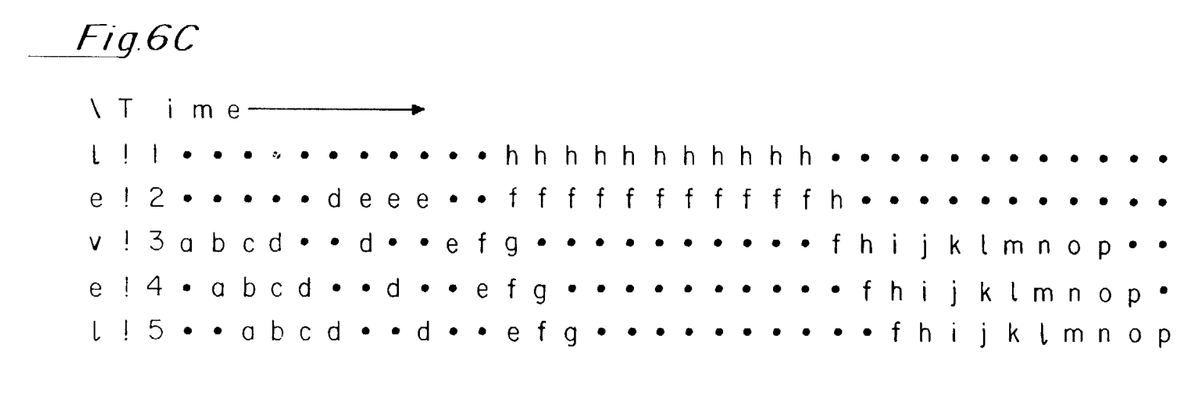

FIGS. 6A, B and C are provided to illustrate the operation of the present invention. FIG. 6A is a table of a code stream received by reference unit 13 of FIG. 1 in a sequence and how they are stored in the top-of-stack queue and the address couple queue as either an even or odd job. FIG. 6B illustrates how the respective jobs of FIG. 6A pass through the various levels of the pipeline of FIGS. 2 and 4 with the split address queue of the present invention. FIG. 6C illustrates how the respective jobs of FIG. 6A will pass through the pipeline of FIGS. 2 and 4 without the present invention.

The sequence of code illustrated in FIG. 6A represents a standard FORTRAN loop for multiplication and addition matrix arithmetic. Actually, this FORTRAN loop employs only eight of the sixteen jobs and is then repeated. In actual practice, this loop would be repeated many thousands of times. It is to be noted from FIG. 6B that jobs j, l, and n are executed out of their normal order with the result that three clock times are saved out of 34. This becomes significant in a FORTRAN program of the type described above where the loop is repeated many thousands of times.

EPILOGUE

A pipeline processor and more particularly a pipeline reference unit, has been disclosed, which reference unit, among other things, creates addresses for main memory. Greater concurrency is achieved by allowing any number of read type operators, which are unaffected by unfinished store operations, to be started before operators that are waiting for a store operation to finish, even though these latter operators may appear earlier in the code stream.

While but one embodiment of the present invention has been described, it will be apparent to those skilled in the art that variations and modifications may be made therein without departing from the spirit and scope of the invention as claimed.

What is claimed is:

1. In a data processing system having a memory and a data processor coupled to said memory to receive a code stream including memory control words for referencing control words in memory and data words in memory, said data processor having program means to separate said control work referencing control words from said data referencing control words, a memory address formation unit comprising:

queue means to receive a sequence of control words some of which reference data words in memory and others of which reference other control words in memory;

a first receiving means coupled to said queue means to receive queue addresses of control words which reference data words;

a second queue address receiving means to receive queue addresses control words which reference other control words;

address formation means coupled to said first and second receiving means for receiving control words and forming memory addresses; and logic means coupled to said first receiving means for transmitting a later received control word for addressing a control word to said address formation means before an earlier received control word for addressing a data word.

2. A memory address formation unit according to claim 1 wherein:
each of said first receiving means and second receiving means is formed of a set of buffer registers for receiving a sequence of said control words respectively.

3. A memory address formation unit according to claim 1 wherein:
said address formation means includes an adder means to add together the data received from said data buffer.

4. A memory address formation unit according to claim 1 wherein:
said logic means includes means to pass only read control words that fetch other control words.

* * * * *